US012507993B2

(12) United States Patent
Rasmussen

(10) Patent No.: US 12,507,993 B2
(45) Date of Patent: Dec. 30, 2025

(54) INSTRUMENT CATCH FOR AN INSTRUMENT GUIDE FOR A PROBE

(71) Applicant: BK MEDICAL APS, Herlev (DK)

(72) Inventor: Karsten Stig Mezini Rasmussen, Bunkeflostrand (SE)

(73) Assignee: BK MEDICAL APS (DK)

( * ) Notice: Subject to any disclaimer, the term of this patent is extended or adjusted under 35 U.S.C. 154(b) by 201 days.

(21) Appl. No.: 18/548,822

(22) PCT Filed: Mar. 4, 2021

(86) PCT No.: PCT/IB2021/051812
§ 371 (c)(1),
(2) Date: Sep. 1, 2023

(87) PCT Pub. No.: WO2022/185099
PCT Pub. Date: Sep. 9, 2022

(65) Prior Publication Data
US 2024/0148361 A1 May 9, 2024

(51) Int. Cl.
A61B 8/00 (2006.01)
A61B 17/34 (2006.01)

(52) U.S. Cl.
CPC ........ A61B 8/4455 (2013.01); A61B 17/3403 (2013.01); A61B 2017/3409 (2013.01); A61B 2017/3413 (2013.01)

(58) Field of Classification Search
CPC ............ A61B 10/0233; A61B 17/3403; A61B 2017/3407; A61B 2017/3409; A61B 2017/3413; A61B 8/0841; A61B 8/12; A61B 8/4455
See application file for complete search history.

(56) References Cited

U.S. PATENT DOCUMENTS

2013/0150714 A1    6/2013  Howlett
2018/0116630 A1    5/2018  Dykes
2019/0021693 A1*   1/2019  Bharat ................ A61B 8/0841
2020/0397399 A1*  12/2020  Adams ................. A61B 8/483

FOREIGN PATENT DOCUMENTS

EP           3086714 B1     1/2021

OTHER PUBLICATIONS

International Application No. PCT/IB2021/051812 filed Mar. 4, 2021—International Search Report and Written Opinion issued on Jan. 25, 2022; 18 pages.

* cited by examiner

Primary Examiner — Michael T Rozanski

(57) ABSTRACT

An instrument catch for an instrument guide configured to attach to an ultrasound imaging probe to guide an instrument for a procedure. The instrument catch comprising a first inner wall, a second inner wall, a first end along a length, a second end along the length, a valley that extends along the length, and a port at an end of the valley. The first ends of the first and second inner walls along a height meet at the valley, protrude up from the valley, and extend in opposing directions forming a channel that tapers from opposing second ends of the first and second inner walls along the height to the first ends of the first and second inner walls.

18 Claims, 6 Drawing Sheets

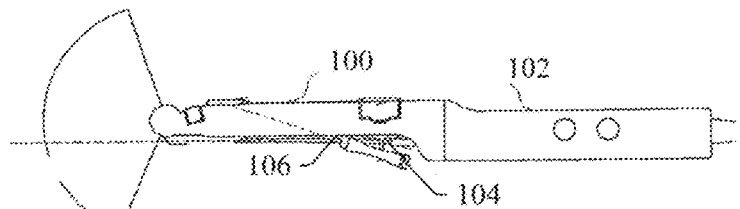
FIGURE 1 (PRIOR ART)
FIGURE 3 (PRIOR ART)
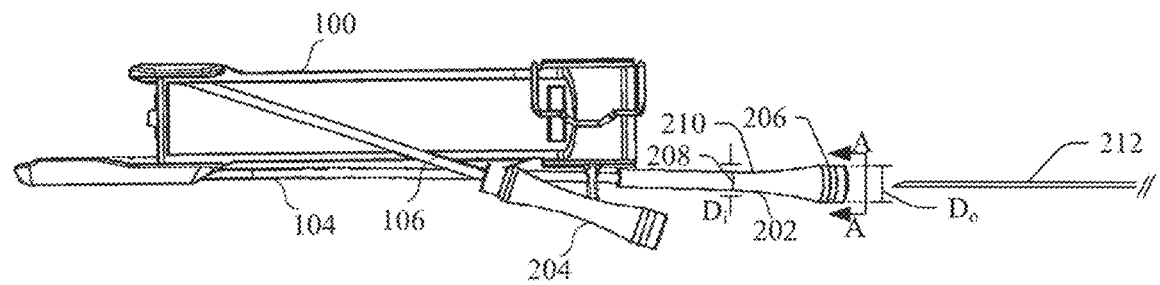
FIGURE 2 (PRIOR ART)
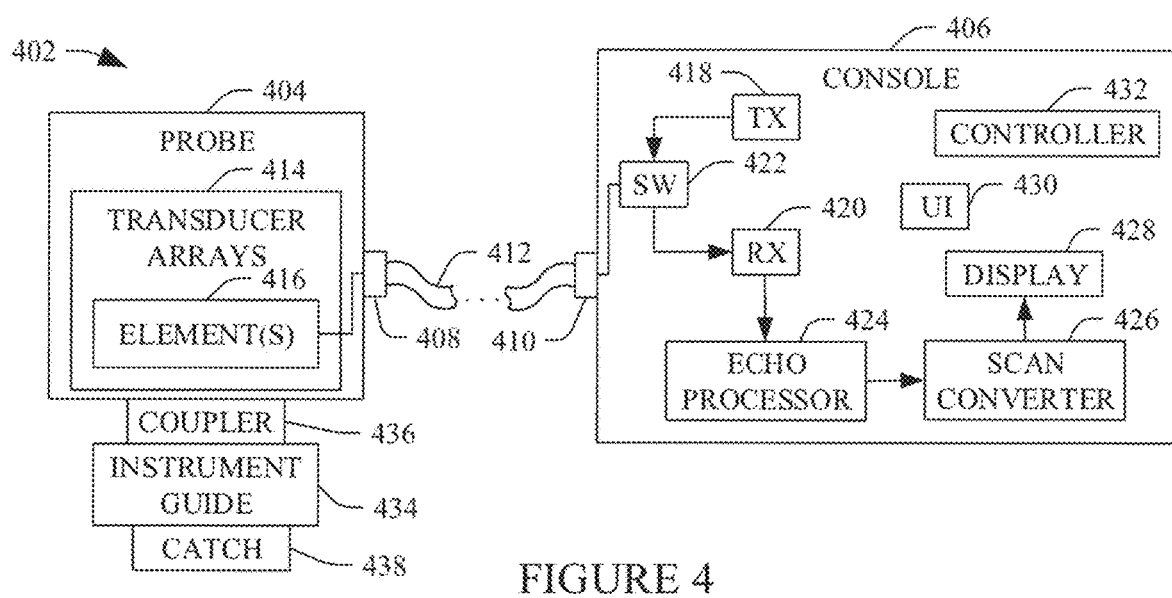
FIGURE 4

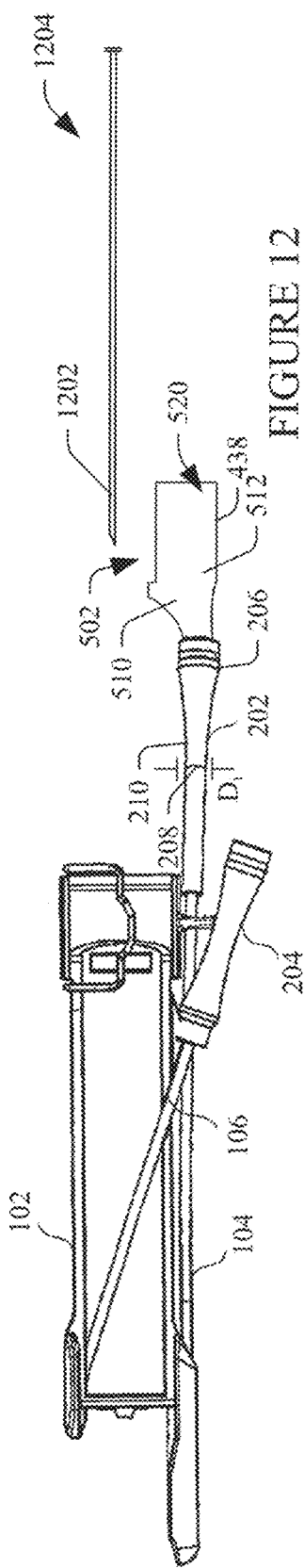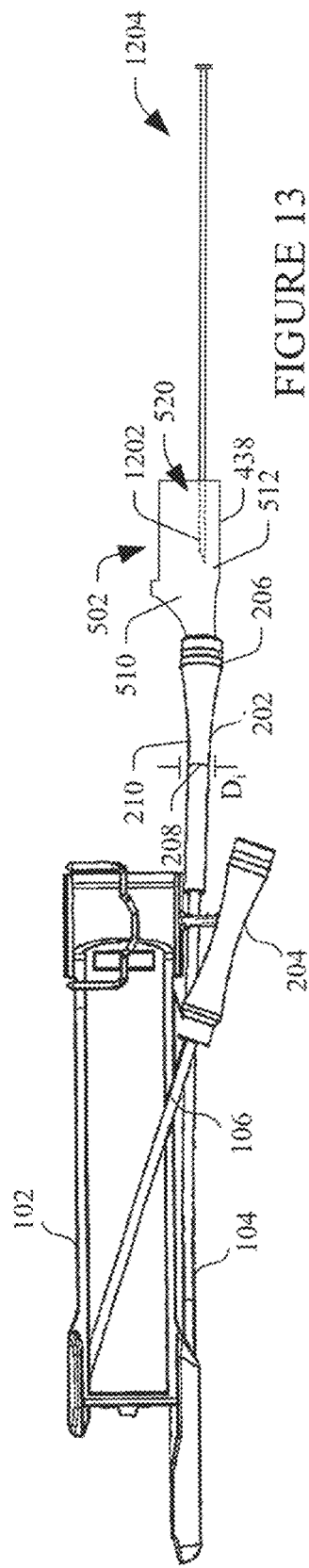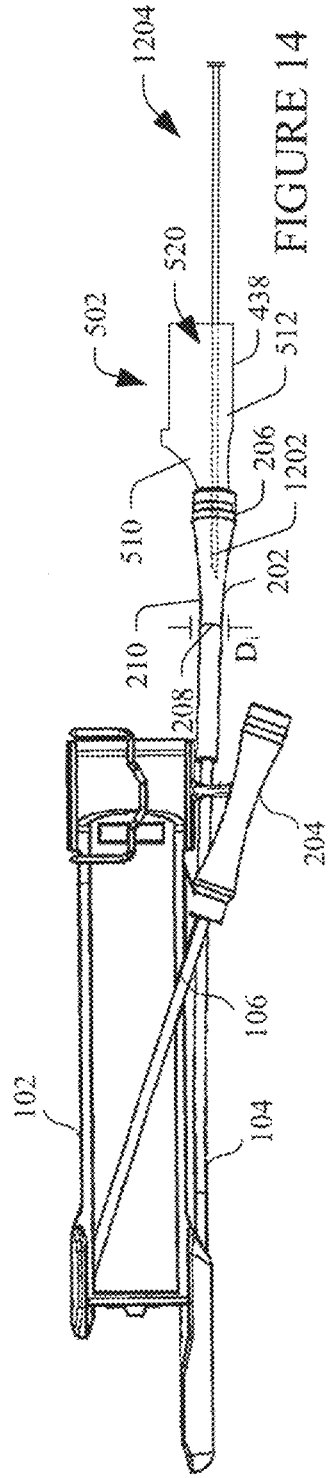

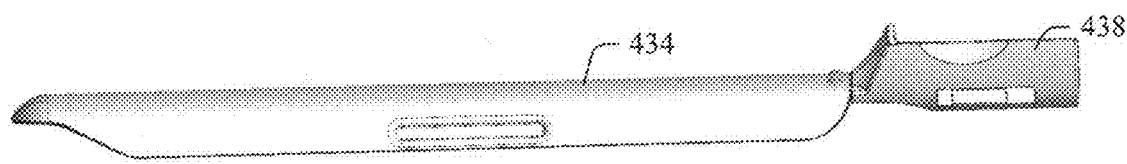
FIGURE 15
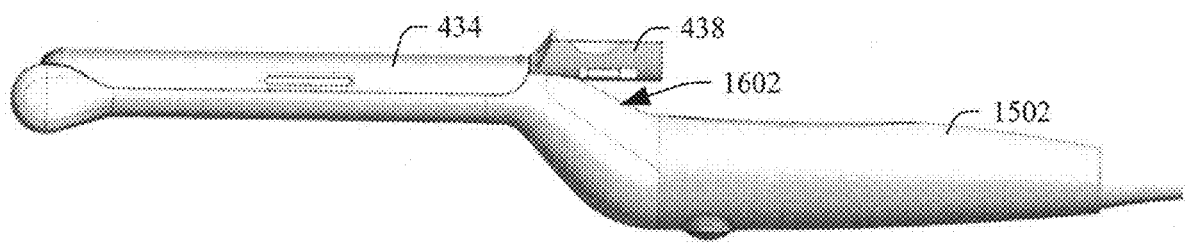
FIGURE 16
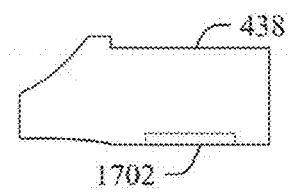 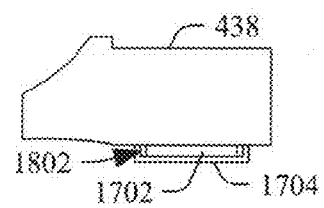 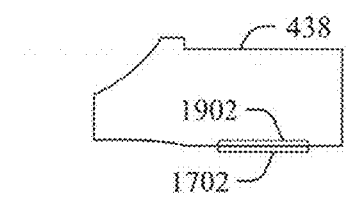
FIGURE 17    FIGURE 18    FIGURE 19

INSTRUMENT CATCH FOR AN INSTRUMENT GUIDE FOR A PROBE

CROSS-REFERENCE TO RELATED APPLICATION

The present application is a national stage application under 35 U.S.C. § 371(c) of PCT Application No. PCT/IB2021/051812, filed on Mar. 4, 2021, the disclosure of which is incorporated herein by reference in its entirety.

BACKGROUND

The following generally relates to an instrument catch for an instrument guide for a probe and is described with particular application to a needle catch for an ultrasound instrument guide for an ultrasound imaging probe; however, it is also amenable to other instrument guides for other imaging modalities.

Ultrasound imaging has provided useful information about the interior characteristics of an object or subject under examination. Such imaging has included ultrasound-guided biopsy and ultrasound-guided ablation needle insertion for diagnostics and treatment procedures. For such procedures, a needle guide is attached to the ultrasound probe and includes a channel for guiding biopsy or ablation needles to tissue of interest for biopsy and ablation procedures.

FIGS. 1 and 2 show an example of a needle guide 100. FIG. 1 shows the needle guide 100 in connection with a probe 102 with the needle guide 100 attached thereto. FIG. 2 shows the needle guide 100 by itself detached from the probe 102. The illustrated needle guide 100 includes two channels, a first channel 104 extending parallel to a long axis of the probe 102, and a second channel 106 extending in a direction of the long axis but crossing or transverse to the long axis.

The first channel 104 has a port 202, and the second channel 106 has a port 204. In the illustrated example, the port 202 has a cylinder shape with an outer end 206 having a first diameter ($D_o$), an inner end 208 having a second smaller diameter ($D_i$), and a convex outer wall 210 tapering between the outer and inner ends 206 and 208. FIG. 3 shows a view into the port 202 from line A-A in FIG. 2. In the illustrated example, the port 204 is structurally similar to the port 202.

For a biopsy procedure, the probe 102 is inserted into a patient (e.g., via the rectum), and an instrument 212 (e.g., a biopsy needle) is inserted into the first channel 104 via the port 202 and advanced to target tissue of interest several times to collect several tissue biopsies. However, this can be difficult because the diameter $D_o$ of the outer end 204 of the port 202 is relatively small, the instrument 212 is long and flexible (e.g., twenty-five centimeters), and the room tends to be dimly lit to enhance viewing the ultrasound image.

Unfortunately, if the clinician misses the port 202 (or port 204), e.g., for a biopsy procedure, the biopsy needle 212 may inadvertently contact and puncture the patient's skin. In view of the foregoing, there is an unresolved need for an improvement for the instrument guide at least for guiding biopsy and ablation instruments for biopsy and ablation procedures.

SUMMARY

According to an aspect of the disclosure, an instrument catch for an instrument guide configured to attach to an ultrasound imaging probe to guide an instrument for a procedure comprises a first inner wall, a second inner wall, a first end along a length, a second end along the length, a valley that extends along the length, and a port at an end of the valley. The first ends of the first and second inner walls along a height meet at the valley, protrude up from the valley, and extend in opposing directions forming a channel that tapers from opposing second ends of the first and second inner walls along the height to the first ends of the first and second inner walls.

In another aspect, an instrument catch for an instrument guide configured to attach to an ultrasound imaging probe to guide an instrument for a procedure comprises first inner wall, a second inner wall, a valley that extends along a length; and a magnet, wherein first ends of the first and second inner walls along a height meet at the valley, and the magnet is disposed at least under the valley.

In yet another aspect, an instrument catch for an instrument guide configured to attach to an ultrasound imaging probe to guide an instrument for a procedure comprises a first inner wall, a second inner wall, and a valley that extends along a length, wherein first ends of the first and second inner walls along a height meet at the valley, and the catch includes a translucent material.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below:

FIG. 1 illustrates an example of a prior art biopsy or ablation needle guide in connection with an ultrasound probe;

FIG. 2 illustrates an example of the prior art biopsy or ablation needle guide of FIG. 1 detached from the probe;

FIG. 3 illustrates an example of an entrance way of a port of the prior art biopsy or ablation needle guide of FIGS. 1 and 2;

FIG. 4 illustrates an example system including an ultrasound probe coupled to an instrument guide with an instrument catch, in accordance with an embodiment(s) described herein;

FIG. 12 illustrates example use of the instrument catch of FIG. 4 in connection with an instrument guide with the instrument above the catch, in accordance with an embodiment(s) described herein;

FIG. 13 illustrates example use of the instrument catch of FIG. 4 in connection with an instrument guide with the instrument received in the catch, in accordance with an embodiment(s) described herein;

FIG. 14 illustrates example use of the instrument catch of FIG. 4 in connection with an instrument guide with the instrument being advanced forward in the catch, in accordance with an embodiment(s) described herein;

FIG. 15 diagrammatically illustrates the instrument catch of FIG. 4 in connection with another instrument guide, in accordance with an embodiment(s) described herein;

FIG. 16 diagrammatically illustrates the instrument catch and instrument guide of FIG. 15 installed on a probe, in accordance with an embodiment(s) described herein;

FIG. 17 diagrammatically illustrates the instrument catch of FIG. 4 with a magnet encapsulated therein, in accordance with an embodiment(s) described herein;

FIG. 18 diagrammatically illustrates the instrument catch of FIG. 4 with a magnet below the catch, in accordance with an embodiment(s) described herein;

FIG. 19 diagrammatically illustrates the instrument catch of FIG. 4 with a magnet installed in the catch thereon, in accordance with an embodiment(s) described herein;

DETAILED DESCRIPTION

Figure 5:
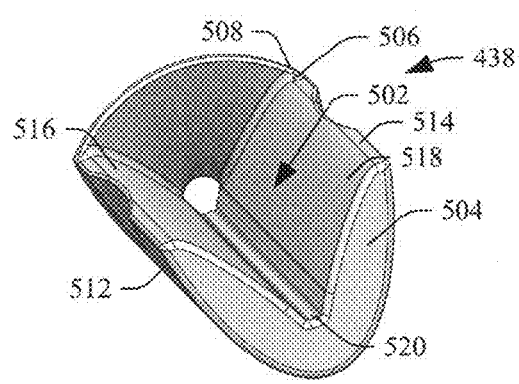
FIG. 5 diagrammatically illustrates a perspective view from one end of the instrument catch of FIG. 4, in accordance with an embodiment(s) described herein.

The following detailed description of example embodiments refers to the accompanying drawings. The same reference numbers in different drawings may identify the same or similar elements.

The foregoing disclosure provides illustration and description but is not intended to be exhaustive or to limit the implementations to the precise form disclosed. Modifications and variations are possible in light of the above disclosure or may be acquired from practice of the implementations.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more" or "at least one." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," "includes," "includes," "including," "comprises," "comprising," or the like are intended to be open-ended terms. Further, the phrase "based on" is intended to mean "based, at least in part, on" unless explicitly stated otherwise. References to "one embodiment" of the present invention are not intended to be interpreted as excluding the existence of additional embodiments that also incorporate the recited features. The terms "first," "second," and "third," etc. are used merely as labels, and are not intended to impose numerical requirements or a particular positional order on their objects. FIG. 4 illustrates an example imaging system 402 such as an ultrasound imaging system/scanner. The imaging system 402 includes a probe 404 and a console 406, which interface with each other through suitable complementary hardware (e.g., cable connectors 408 and 410 and a cable 412 as shown, etc.) and/or wireless interfaces (not visible).

The probe 404 includes one or more transducer arrays 414 with one or more transducer elements 416. The one or more transducer elements 416 are arranged as a 1-D or 2-D, linear, curved and/or otherwise shaped, fully populated or sparse, etc. array. The elements 416 are configured to convert excitation electrical pulses into an ultrasound pressure field and convert a reflected and received ultrasound pressure field into an echo (e.g., a radio frequency (RF)) signal. An example of such a probe is the probe 102 of FIG. 1. Other probes are also contemplated herein.

The console 406 includes transmit circuitry (TX) 418 configured to generate the excitation electrical pulses and receive circuitry (RX) 420 configured to process the RF signals, e.g., amplify, digitize, and/or otherwise process the RF signals. The console 406 further includes a switch (SW) 422 configured to switch between the TX 418 and RX 420 for transmit and receive operations, e.g., by electrically connecting and electrically disconnecting the TX 418 and the RX 420. In an alternative embodiment, the TX 418 and the RX 420 are each connected to their own switches.

The console 406 includes further an echo processor 424 configured to process the signal from the RX 420. For example, in one instance the echo processor 424 is configured to beamform (e.g., delay-and-sum) the signal to construct a scan plane of scanlines of data. The echo processor 424 can process data from 1-D and/or 2-D probes for 2-D, 3-D and/or 4-D applications. The echo processor 424 can be implemented by a hardware processor such as a central processing unit (CPU), a graphics processing unit (GPU), a microprocessor, etc.

The console 406 further includes a scan converter 426 configured to scan convert the output of the echo processor 424 to the coordinate system of a display 428, which displays the scan converted data as images. In one instance, the scan converting includes changing the vertical and/or horizontal scan frequency of signal based on the display 428. The scan converter 426 can be configured to employ analog scan converting techniques and/or digital scan converting techniques. In one instance, the images are images of the sagittal plane.

The console 406 further includes a user interface 430, which includes one or more input devices (e.g., a button, a touch pad, a touch screen, etc.) and one or more output devices (e.g., a display screen, a speaker, etc.). The console 406 further includes a controller 432 configured to control one or more of the probe 404, the transmit circuitry 418, the receive circuitry 420, the switch 422, the echo processor 424, the scan converter 426, the display 428, the user interface 430, and/or one or more other components of the imaging system 402.

In the illustrated embodiment, the probe 404 is used with an instrument guide 434 such as a needle guide, e.g., for guiding a biopsy needle, an ablation needle, etc. As such, in one instance, the instrument guide 434 is used to guide a biopsy needle to a target region within an object or subject, and, in another instance, the instrument guide 434 is used to guide an ablation needle to a target region within an object or subject. A coupler 436 couples the instrument guide 434 and the probe 404.

An instrument catch ("catch") 438 is attached to the instrument guide 434. As described in greater detail below, the catch 438 is configured to facilitate inserting an instrument in the instrument guide 434. For example, in one embodiment the catch 438 guides a needle to a channel in the instrument guide 434. This may allow for easy, quick and/or safe insertion of an instrument into the instrument guide 434, relative to an embodiment in which the catch 438 is not used with the instrument guide 434. Also described below, in other embodiments, the catch 438 includes a magnet and/or is illuminated to facilitate inserting an instrument in the instrument guide 434.

Figure 6:
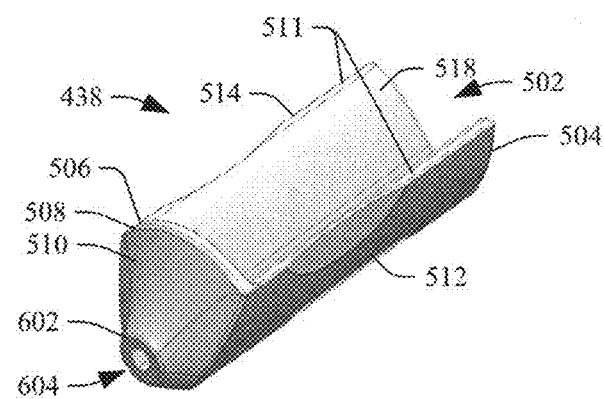
FIG. 6 diagrammatically illustrates a perspective view from another end of the instrument catch of FIG. 4, in accordance with an embodiment(s) described herein.
Figure 7:
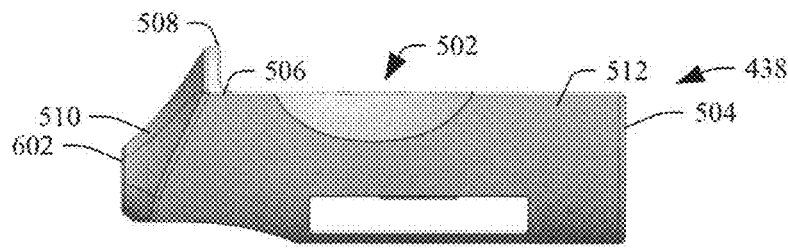
FIG. 7 diagrammatically illustrates a side view of the instrument catch of FIG. 4, in accordance with an embodiment(s) described herein.
Figure 8:
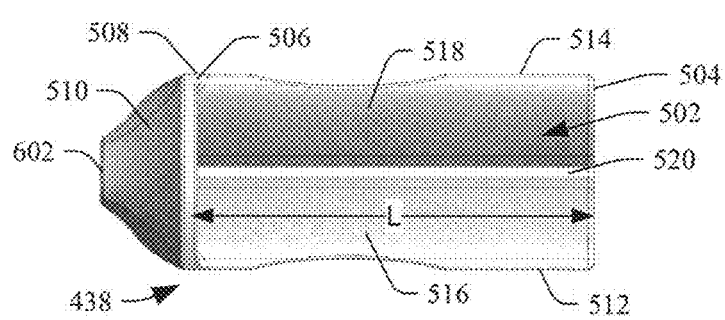
FIG. 8 diagrammatically illustrates a view into the instrument catch of FIG. 4, in accordance with an embodiment(s) described herein.
Figure 9:
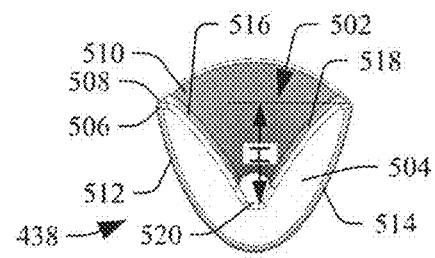
FIG. 9 diagrammatically illustrates a view into an end of the instrument catch of FIG. 4, in accordance with an embodiment(s) described herein.
Figure 10:
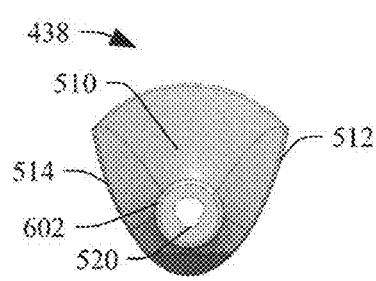
FIG. 10 diagrammatically illustrates a view into the other end of the instrument catch of FIG. 4, in accordance with an embodiment(s) described herein.
Figure 11:
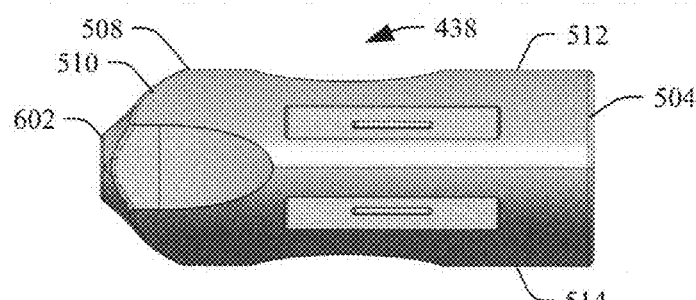
FIG. 11 diagrammatically illustrates a view from below the channel of the instrument catch of FIG. 4, in accordance with an embodiment(s) described herein.

FIGS. 5-11 diagrammatically illustrates an example of the catch 438. FIGS. 5 and 6 diagrammatically illustrate perspective views of the catch 438 from opposing ends of the catch 438. FIG. 7 diagrammatically illustrates a side view of the catch 438. In this embodiment opposing sides are substantially similar and thus only one side is shown. FIG. 8 diagrammatically illustrates a view into the catch 438. FIGS. 9 and 10 diagrammatically illustrate views into opposing ends of the catch 438. FIG. 11 diagrammatically illustrates a view from the below the channel of the catch 438.

The illustrated catch 438 includes a generally "V," "U" or similar shaped channel 502 with a first end 504 with an opening and a second end 506 that is coupled to one end 508 of a funnel 510. The channel 502 has sides 511 that includes outer walls 512 and 514 and inner walls 516 and 518 which meet at a valley 520 of the "V," "U" or similar shaped channel 502. A surface profile of the inner and/or outer walls 512, 514, 516 and 518 can be planar, concave and/or convex, constant or wider at one of the ends, etc. The valley 520 extends from the first end 504, to the second end 506, through the funnel 510, to a smaller end 602 and port 604 of the funnel 510. The funnel 510 is tubular shaped with a concave outer surface.

In the illustrated embodiment, the channel 502 has a length "L" (FIG. 8) in a range of 2 to 100 mm and a height "H" (FIG. 9) in a range of 1 to 200 mm. Other geometry is contemplated herein, e.g., larger and/or smaller lengths and/or heights. In general, the length and/or height are configured based on the application, e.g., for biopsy and/or ablation procedures using a needle, to easily receive an end portion of the needle and guide the needle through to a channel of the instrument guide 434. For example, with respect to FIGS. 1 and 2, to receive the needle 212 and guide it to the port 206 or the channel 104.

An example of this is shown in FIGS. 12, 13 and 14. In FIG. 12, an end portion 1202 of a needle 1204 (e.g., the instrument 212 in FIG. 2) is hovered over the channel 502. In FIG. 13, the end portion 1202 of the needle 1204 is lowered into the valley 520. In FIG. 14, the end portion 1202 of the needle 1204 is advanced through the catch 438 through the port 202 and into the channel 104. In FIGS. 13 and 14, the dotted lines indicate the needle 1202 is in the catch 438 behind the wall 512. In one instance, the funnel 510 facilitates preventing "overshoot" and potential patient stick outside of the channel 104.

With this example, in one instance the catch 438 is part of the port 202 or the first channel 104 in that the catch 438 is a component of the instrument guide 434. In a variation, the catch 438 is configured to releasably attach to the port 202 or the first channel 104. For example, in one instance one of the catch 438 or the port 202 or the first channel 104 is threaded and the other of the catch 438 or the port 202 or the first channel 104 has complementary grooves, and the catch 438 and the port 202 or the first channel 104 are attached through engaging the grooves with the threads. In another instance, the catch 438 and one of the port 202 or the first channel 104 snap together. In yet another instance, the catch 438 and one of the port 202 or the first channel 104 are held together by a clamp. Other coupler 436 fastening mechanism such as a set screw, a lock, etc. are contemplated herein.

Although FIGS. 12-14 show the catch 438 in connection with the port 202 or the first channel 104, it is to be appreciated that another catch can be utilized with the port 204 or the channel 106 concurrently with use of the port 204 and/or channel 104 or alternatively thereto. Where the instrument guide 434 includes multiple channels, different color catches 438 can be utilized to facilitate distinguishing between the channels. In another embodiment, the catch 438 is coupled directly to the channel 104 and/or 106. With this embodiment, the ports 204 and 206 are absent.

FIGS. 15 and 16 show the catch 438 with a different configuration of the instrument guide 434. In FIGS. 12-14, the instrument guide 434 is similar to the instrument guide 100 of FIGS. 1 and 2 and connects to a side of an elongate shaft of the probe 102. In FIGS. 15 and 16, the instrument guide 434 attaches to a top of an elongate shaft of a probe 1502. The coupler 436 fastening mechanism can be similar to as described herein, e.g., the instrument guide 434 can snap on to the top of the elongate shaft of the probe 1502.

Similar to the configuration shown in FIGS. 12-14, in one instance the catch 438 is part of the instrument guide 434, while in another instance, the catch 438 is configured to releasably attach to the instrument guide 434. In FIGS. 4-20, the catch 438 may be sterilizable and/or disposable. This includes configurations in which the catch 438 is separate from the instrument guide 434 and configurations in which the catch 438 is part of the instrument guide 434. Other instrument guides are contemplated herein.

Variations are contemplated. In one variation, the instrument guide 434 and catch 438 are configured to rotate around a long axis of the probe, e.g., via a tube or other mechanism, to allow use at any probe rotation angle.

In the variations shown in FIGS. 17, 18 and 19, the catch 438 further includes a magnet 1702. In one instance, the magnet 1702 facilitates placing the instrument in the valley 520, e.g., through a magnetic force that attracts the instrument to the valley 520. For example, with respect to FIGS. 12-14, the magnet 1702 has a strength which pulls the needle 1202 into the valley 520 but allows the user to advance the needle 1202 to the port 202 or channel 104. In one instance, the magnetic strength is such that it pulls an instrument up to 10, 20, 50, etc. millimeters away. In one instance, the magnet includes a rare-earth element belonging to the lanthanide series such as neodymium.

In FIG. 17, the magnet 1702 is located under the valley 520 an encapsulated inside of the catch 438. In FIG. 18, the catch 438 further includes a magnet holder or carrier 1802 located under the catch 438. In one instance, the magnet 1702 is encapsulated inside of the magnet holder 1802. In another instance, the magnet 1702 is removable installed in the magnet holder 1802 for a procedure and removed therefrom thereafter. In FIG. 19, the catch 438 further includes a recess 1902 under the catch 438. In one instance, the magnet 1702 is installed in the recess 1902 so as to be part of the catch 438, e.g., an adhesive such as a glue, etc. In another instance, the magnet 1702 is removably installed in the recess 1902 for a procedure and removed therefrom thereafter, e.g., via a hook-and-loop fastener, a complementary magnetic surface, etc.

In a variation, the magnet 1702 is located in the probe 1502 under the region where the catch 438 is located when the instrument guide 434 and catch 438 are installed on the probe, e.g., a region 1602 in FIG. 16. In this instance, the magnet 1702 can be on an outside surface of the probe 1502 and/or inside of the probe 1502.

In a variation, the magnet 1720 is an electromagnet, located in the probe 1502, in such a way that when active, the magnetic force attracts the needle and pulls it into the valley of the catch 438.

With FIGS. 17, 18 and 19, a magnetic shield can be utilized on sides on the magnet 1702 not facing the valley 520. Additionally, or alternatively, the walls 512, 514, 516 and 518 and/or the cone 510 may also include a magnetic shield. Such a shield may prevent or reduce any magnetic interference of the magnet 1702 with a magnetic tracking device utilized to track the needle and/or probe during a procedure.

Figure 20:
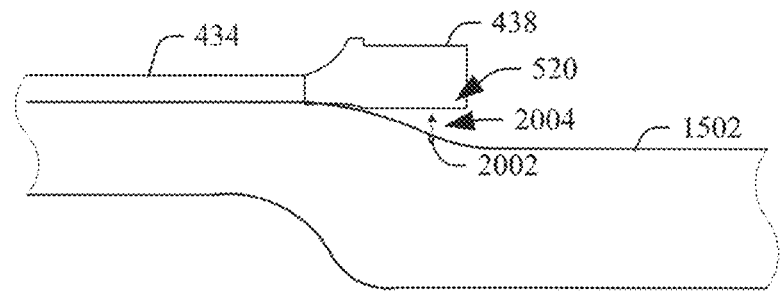
FIG. 20 diagrammatically illustrates the instrument catch of FIG. 4 installed on a probe with a light source of the probe configured to illuminate the catch, in accordance with an embodiment(s) described herein.
Figure 21:
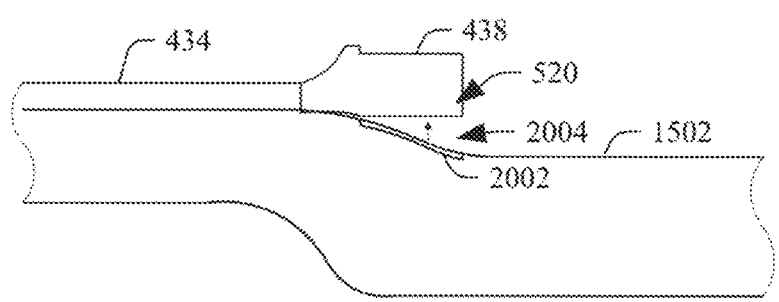
FIG. 21 diagrammatically illustrates the instrument catch of FIG. 4 installed on a probe with another light source of the probe configured to illuminate the catch, in accordance with an embodiment(s) described herein.

In the variations shown in FIGS. 20 and 21, the catch 438 is translucent and the probe 1502 includes a light source 2002 configured to emit light in a direction of the catch 438. In one instance, the light source 2002 facilitates placing an instrument in the valley 520, especially in instances in which the examination room is dimly lit. In FIG. 20, the light source 2002 is single light such as a light emitting diode (LED), an optical fiber, etc. In FIG. 21, the light source 2002 includes a line of lights such as LEDs, optical fibers, a rope light, etc. The light source 2002 can be part of the probe 1502 and/or a separate device that attaches to the probe 1502. Where the instrument guide 434 includes multiple channels, different color lights can be utilized to facilitate distinguishing between the channels.

Figure 22:
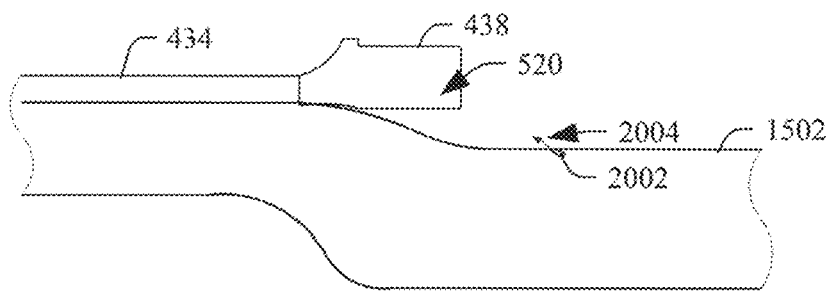
FIG. 22 diagrammatically illustrates the instrument catch of FIG. 4 installed on a probe with yet another light source of the probe configured to illuminate the catch, in accordance with an embodiment(s) described herein.

In the variation shown in FIG. 22, the catch 438 is translucent or opaque and the light source 2002 is located on the probe 1502 to emit light in a direction of the catch 438 to illuminate the channel 512. In the illustrated embodiment, the light illuminate from the back of the catch 438. In another instance, the light illuminate from the front and/or the top of the catch 438. Likewise, where the instrument guide 434 includes multiple channels, different color lights can be utilized to facilitate distinguishing between the channels.

In another variation, the catch 438 includes the light source 2002. For example, in one instance the catch 438 includes a micro-lamp comprising an LED and an energy source such as a single use environmentally friendly battery and/or a capacitor. In another example, the light source includes phosphorescent substance. With this embodiment, the catch 438 is exposed to light prior to the procedure and the light emitted by the phosphorescent substance is used during the procedure to illuminate the catch 438.

In another variation, the magnet 1702 and the light source 2002 are utilized in combination. The light source 2002 and magnet 1702 can be an integrated, reusable, rechargeable unit for single-use and reusable needle guides. Recharging can be achieved via heat in the washing device, ultraviolet (UV) light in a sterilizer, etc. Additionally, or alternatively, the light source 2002 and/or another light source is utilized to illuminate the insertion area on the patient.

Figure 23:
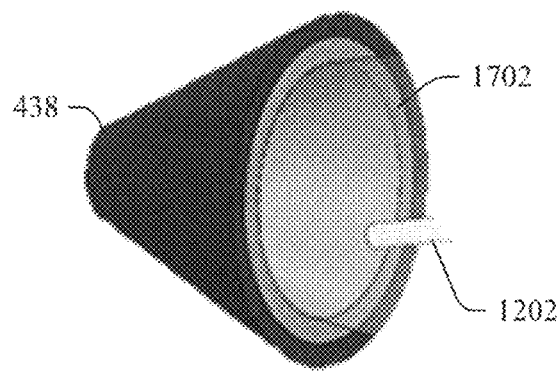
FIG. 23 diagrammatically illustrates another configuration of the instrument catch of FIG. 4, in accordance with an embodiment herein.

FIG. 23 diagrammatically illustrates a configuration in which the catch 438 is conical shaped. The magnet 1702, in the illustrated embodiment, is also conical in shape and is disposed on an inside surface of the conical shaped catch 438. Alternatively, the magnet 1702 can be a ring disposed at and around the entrance of the conical shape catch 438. In these instances, the magnet 1702 repels the needle 1202 from the sides to guide the needle through the catch 438 and to the instrument guide 434. In FIG. 23, the catch 438 can include magnetic shield or shielding material. Alternatively, or additionally, a magnetic shield can be disposed on an outer surface of the conical shaped catch 438. In this instance, the magnetic shield can be cone or ring shaped like the magnet or otherwise shaped. Alternatively, a magnetic shield is not utilized.

Figure 24:
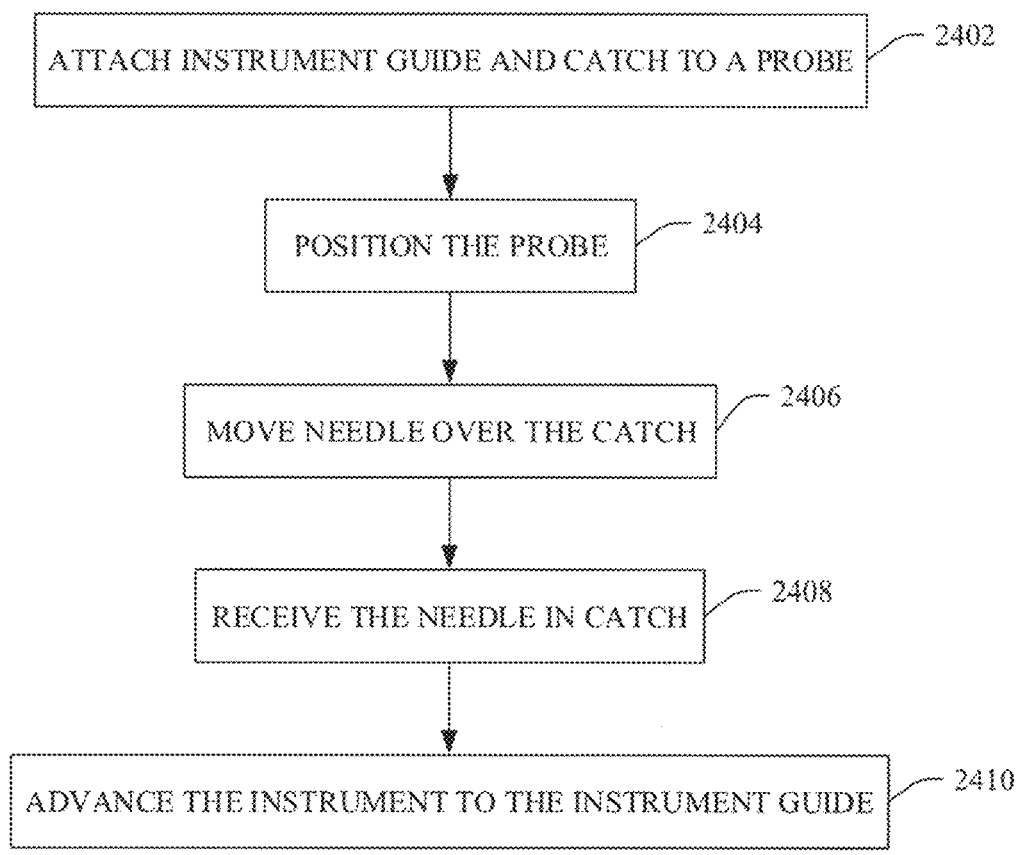
FIG. 24 illustrates another method, in accordance with an embodiment herein.

FIG. 24 illustrates an example method in accordance with an embodiment herein. At 2402, the instrument guide 434 with the catch 438 is attached to a probe, as described herein and/or otherwise. At 2404, the probe is positioned with respect to the patient, as described herein and/or otherwise. At 2406, a free end portion of an instrument is moved over the catch 438, as described herein and/or otherwise. At 2408, the free end portion is received in the catch 438, as described herein and/or otherwise. At 2410, the instrument is advanced through the catch 438 to the instrument guide 434 for the procedure, as described herein and/or otherwise. The instrument is then used to perform a procedure.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. An instrument catch for an instrument guide configured to attach to an ultrasound imaging probe to guide an instrument for a procedure, the instrument catch, comprising:
   a first inner wall;
   a second inner wall;
   a distal end along a length;
   a proximal end along the length;
   a valley that extends along the length;
   a port at an end of the valley; and a cone disposed at the distal end of the instrument catch, wherein the valley extends through an interior of the cone to the port at the distal end;

wherein lower ends of the first and second inner walls along a height meet at the valley, protrude up from the valley, and extend in opposing directions forming a channel that tapers outwards from the lower ends to upper ends of the inner walls, wherein the upper end of the first wall defines a first edge extending along the length and the upper end of the second wall defines a second edge extending along the length, the first and second edges being parallel, wherein the first and second edges terminate into a proximal side of the cone.

2. The instrument catch of claim 1, wherein the channel is "V" shaped.

3. The instrument catch of claim 1, wherein the first and second inner walls are one of planar, concave, or convex.

4. The instrument catch of claim 1, further comprising: a magnet disposed under the valley.

5. The instrument catch of claim 1, wherein the catch is translucent.

6. An instrument catch for an instrument guide configured to attach to an ultrasound imaging probe to guide an instrument for a procedure, the instrument catch, comprising:
a first inner wall;
a second inner wall;
a valley that extends along a length;
a cone disposed at a distal end of the valley; and
a magnet,
wherein lower ends of the first and second inner walls along a height meet at the valley, and the magnet is disposed at least under the valley,
wherein an upper end of the first wall defines a first edge extending along the length of the catch and an upper end of the second wall defines a second edge extending along the length, the first and second edges being parallel,
wherein the first and second edges terminate into a proximal side of the cone.

7. The instrument catch of claim 6, wherein the magnet is encapsulated in the catch.

8. The instrument catch of claim 6, wherein the catch includes a magnet carrier below the valley and the magnet is removably installed in the magnet carrier.

9. The instrument catch of claim 6, wherein the magnet is affixed in a recess in the catch below the valley.

10. The instrument catch of claim 6, wherein the catch includes a translucent material.

11. The instrument catch of claim 6, wherein the catch is cone shaped and the magnet is one of cone or ring shaped.

12. The instrument catch of claim 7, further comprising:
a distal end along the length;
a proximal end along the length; and
a port at a distal end of the valley;
wherein the lower ends of the first and second inner walls along the height meet at the valley, protrude up from the valley, and extend in opposing directions forming a channel that tapers inwards from opposing upper ends of the first and second inner walls along the height to the lower ends of the first and second inner walls.

13. An instrument catch for an instrument guide configured to attach to an ultrasound imaging probe to guide an instrument for a procedure, the instrument catch, comprising:
a first inner wall;
a second inner wall;
a valley that extends along a length; and
a cone disposed at a distal end of the valley,
wherein lower ends of the first and second inner walls along a height meet at the valley, and the catch includes a translucent material
wherein an upper end of the first wall defines a first edge extending along the length of the catch and an upper end of the second wall defines a second edge extending along the length, the first and second edges being parallel,
wherein the first and second edges terminate into a proximal side of the cone.

14. The instrument catch of claim 13, further comprising:
a distal end along the length;
a proximal end along the length; and
a port at a distal end of the valley,
wherein, the first and second inner walls protrude up from the valley and extend in opposing directions forming a channel that tapers inwards from opposing upper ends of the first and second inner walls along the height to the lower ends of the first and second inner walls.

15. The instrument catch of claim 14, further comprising: a light source.

16. The instrument catch of any of claim 14, further comprising:
a magnet disposed under the valley.

17. The instrument catch of claim 16, wherein the magnet is removably installed under the valley.

18. The instrument catch of claim 16, wherein the magnet is a component of the catch.

* * * * *